US008965726B2

(12) United States Patent
Lajevardi et al.

(10) Patent No.: US 8,965,726 B2
(45) Date of Patent: Feb. 24, 2015

(54) SYSTEM AND METHOD FOR MEASURING DC OFFSET IN A SENSOR OUTPUT BY MODULATING A SIGNAL-INDEPENDENT OPERATING PARAMETER OF THE SENSOR

(75) Inventors: Pedram Lajevardi, Stanford, CA (US); Vladimir Plamenov Petkov, Mountain View, CA (US); Christoph Lang, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 1238 days.

(21) Appl. No.: 12/070,641

(22) Filed: Feb. 20, 2008

(65) Prior Publication Data
US 2009/0210185 A1    Aug. 20, 2009

(51) Int. Cl.
*G06F 19/00* (2011.01)
*G01D 3/036* (2006.01)
(52) U.S. Cl.
CPC ........................................ *G01D 3/036* (2013.01)
USPC ................................ 702/104; 702/64; 702/69
(58) Field of Classification Search
USPC .............................................. 702/64, 69, 104
See application file for complete search history.

(56) References Cited

U.S. PATENT DOCUMENTS

| | | | |
|---|---|---|---|
| 4,434,451 A * | 2/1984 | Delatorre ................... | 361/283.4 |
| 6,032,109 A | 2/2000 | Ritmiller, III | |
| 6,285,958 B1 * | 9/2001 | Wolf et al. ....................... | 702/87 |
| 6,400,295 B1 | 6/2002 | Van Herzeele | |
| 6,868,726 B2 | 3/2005 | Lemkin et al. | |
| 6,972,705 B1 | 12/2005 | Fei et al. | |
| 2004/0130471 A1 * | 7/2004 | Lee ................................ | 341/143 |
| 2005/0143032 A1 * | 6/2005 | Matsushita et al. ......... | 455/232.1 |
| 2005/0270014 A1 * | 12/2005 | Zribi et al. ..................... | 324/126 |
| 2007/0247141 A1 * | 10/2007 | Pastre et al. ................... | 324/202 |
| 2008/0284628 A1 * | 11/2008 | Willig et al. .................. | 341/143 |

FOREIGN PATENT DOCUMENTS

DE     10046566 A1 *  4/2002
(Continued)

OTHER PUBLICATIONS

Smith, J., Introduction to Digital Filters with Audio Applications, Standford University, Sep. 2007.*
(Continued)

*Primary Examiner* — Mischita Henson
(74) *Attorney, Agent, or Firm* — Maginot Moore & Beck LLP

(57) ABSTRACT

A sensor circuit enables detection of DC offset in a sensor output signal. The sensor circuit includes a sensor that generates a sensor output signal corresponding to a physical signal coupled to an input of the sensor, and a modulator that generates a modulation signal, the modulator being coupled to the sensor to modulate a physical parameter of the sensor and to enable a DC offset to be separated from the sensor output signal. To enable the circuit to measure the DC offset even though the sensor output signal is inversely proportional to the output signal, the circuit includes a feedback circuit configured to generate a feedback signal. The feedback signal is coupled to the input of the sensor to enable the physical parameter of the sensor to be modulated without modulating a portion of the sensor output signal attributable to the physical signal being converted to an electrical signal by the sensor.

20 Claims, 2 Drawing Sheets

(56) References Cited

FOREIGN PATENT DOCUMENTS

| | | | | |
|---|---|---|---|---|
| JP | H07-311100 A | 11/1995 | | |
| JP | H10-239196 A | 9/1998 | | |
| JP | 2000-512020 A | 9/2000 | | |
| JP | 2002-176327 A | 6/2002 | | |
| JP | 2004-215270 A | 7/2004 | | |
| JP | 2005-295494 A | 10/2005 | | |
| JP | 2006-071336 A | 3/2006 | | |
| WO | WO2006079435 A1 * | 8/2006 | .............. | H03M 3/02 |

OTHER PUBLICATIONS

Colwell, C., Resource Lesson Parallel Plate Capacitors, Physics LAB Online, 2007.*

English Translation of Japanese Notice of Reasons for Refusal corresponding to Japanese Application No. 2009-037401, dated Jul. 1, 2013 (3 pages).

English Translation of Final Japanese Notice of Reasons for Refusal corresponding to Japanese Application No. 2009-037401, dated Oct. 21, 2013 (4 pages).

* cited by examiner

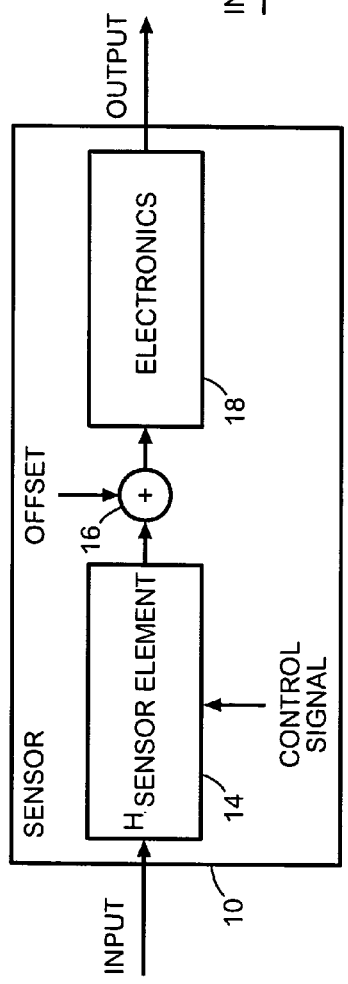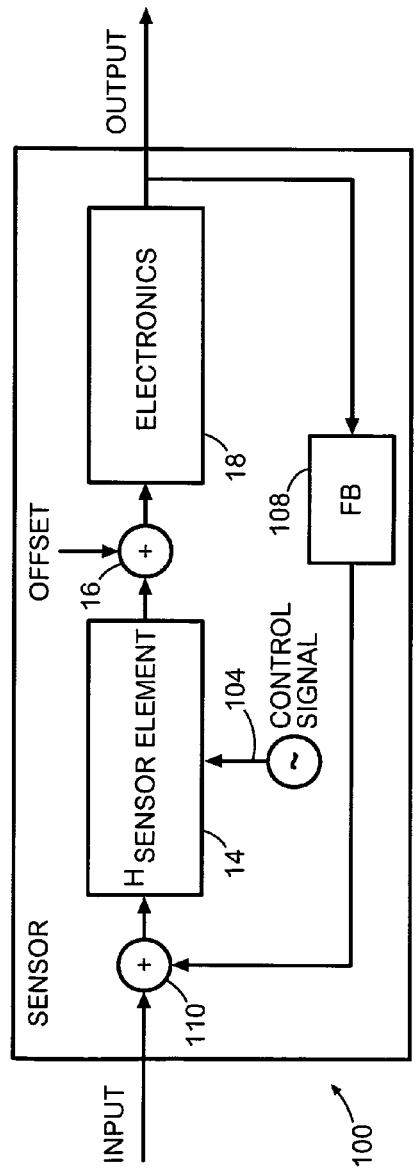

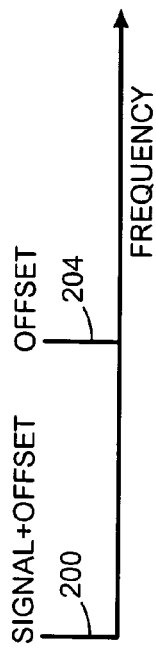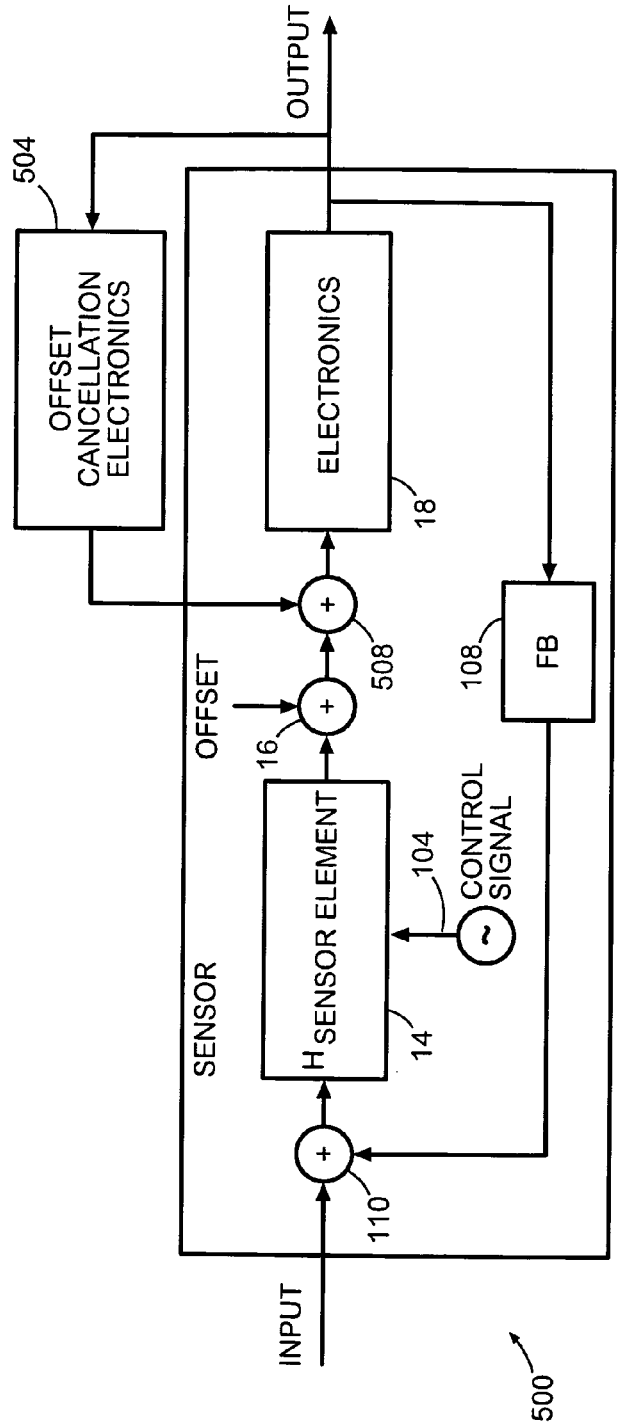

SYSTEM AND METHOD FOR MEASURING DC OFFSET IN A SENSOR OUTPUT BY MODULATING A SIGNAL-INDEPENDENT OPERATING PARAMETER OF THE SENSOR

TECHNICAL FIELD

This disclosure relates generally to techniques for measuring DC offset in sensors and, more particularly, to techniques for measuring DC offset in sensors having variable signal-independent operating parameters.

BACKGROUND

A sensor includes a physical parameter element that converts a physical parameter, such as acceleration, force, pressure, temperature, or the like into an electrically measurable signal, such as a capacitance, resistance, frequency, or charge. For example, a spring-mass-damper system may be used as a physical parameter element in an inertial sensor to generate an electrically measurable signal corresponding to an acceleration force. The sensor also includes an electronic interface, which uses the electrically measurable signal to output a voltage or digital value that is proportional to the physical parameter.

Most sensors experience a DC offset in the interface between the sensor output and the electronic components that generate the sensor circuit output signal. For example, a sensor circuit 10 is shown in FIG. 1. The sensor circuit 10 includes a sensor 14 and an electronic interface 18. The physical signal is sensed as input to the sensor 14, which generates an electrically measurable signal. A DC offset may be added to this signal before it is input to the electronic interface to generate the output signal.

In previously known sensors, the output signal of a sensor is measured for a zero value physical parameter input to identify the DC offset for the sensor. This measurement is identified during circuit construction and the DC offset value may then be stored as a data value or incorporated in a circuit element so it can be subtracted from the signal output of the sensor. The elimination of the DC offset is useful as the DC offset in some sensors may be larger than the signal that is proportional to the physical parameter being sensed by the sensor. Thus, elimination or attenuation of the DC offset enables the output range of the sensor to be used for representing the physical parameter being sensed instead of the DC offset.

Unfortunately, the DC offset does not always remain in a relatively tight range about the value measured at circuit construction. The change may arise from thermal conditioning of the sensor or changes in the wire bonds coupling the sensor to the electronic interface. A new measurement of the DC offset cannot be obtained in the field as it was during circuit construction because the input of the sensor cannot be de-coupled from the physical parameter. Consequently, the changes in the DC offset value that occur after manufacture of the sensor affect the measurement signal generated by the sensor circuit. Detection and measurement of DC offset changes during operational use of a sensor is desirable.

SUMMARY

A sensor circuit enables detection of DC offset in a sensor output signal. The sensor circuit includes a sensor that generates a sensor output signal corresponding to a physical signal coupled to an input of the sensor, and a modulator that generates a modulation signal, the modulator being coupled to the sensor to modulate a physical parameter of the sensor and enable a DC offset to be separated from the sensor output signal. To enable the circuit to detect DC offset in the sensor output signal that is inversely proportional to a physical parameter of the sensor, the circuit includes a feedback circuit configured to generate a feedback signal, the feedback signal being coupled to the input of the sensor to enable the physical parameter of the sensor to be modulated without modulating a portion of the sensor output signal that is attributable to the physical signal being converted to an electrical signal by the sensor.

The system may be used to implement a method that enables detection of a DC offset in a sensor output signal. The method includes generating a sensor output signal from a physical signal with a sensor, modulating a physical parameter of the sensor at a modulation frequency, monitoring the sensor output signal at the modulation frequency, and detecting a DC offset in the sensor output signal in response to the sensor output signal at the modulation frequency being greater than a threshold. The method may also include generating a feedback signal, and coupling the feedback signal to an input of the sensor to enable the physical parameter of the sensor to be modulated without modulating a portion of the sensor output signal that is attributable to the physical signal being converted to an electrical signal by the sensor.

BRIEF DESCRIPTION OF THE DRAWINGS

The foregoing aspects and other features of a method and system in which an offset generated during operation of a sensor is identified for compensating the offset are explained in the following description, taken in connection with the accompanying drawings, wherein:

FIG. 1 is a block diagram of a sensor that generates an output signal that corresponds to a physical parameter sensed at the input of the sensor.

FIG. 2 is a block diagram of a sensor circuit configured with a feedback circuit useful for measuring a DC offset during the operational life of the sensor.

FIG. 3 is a block diagram of a sensor circuit having feedback.

FIG. 4 is a graph of the output signal in the frequency domain, which is generated by the circuit of FIG. 2, and depicts the separation of a sensor measurement signal and a modulated DC offset.

FIG. 5 is a block diagram of the circuit shown in FIG. 2 modified to incorporate an offset cancellation circuit that compensates for DC offset in the output signal of the sensor.

DETAILED DESCRIPTION

A system 10 that incorporates a sensor 14 is shown in FIG. 1. The system includes a sensor 14 having a transfer function H, a DC offset node 16, and conditioning electronics 18. An input signal is applied to the sensor 14 and the output of the sensor is provided to the conditioning electronics for generation of an output signal. For example, a physical force may be applied to a MEMS inertial sensor to generate a sensor signal indicative of the magnitude of the force acting on the sensor. The sensor signal is processed by the conditioning electronics 18 to generate an electrical signal that may be provided to a digital signal processing circuit.

Preferably, the DC offset of a sensor 14 is zero. During manufacture, however, the physical properties of the bonding wires and other components in the circuit may introduce a DC offset voltage in the output of the sensor 14. For example, the interface between the sensor 14 and the conditioning electronics 18 includes the bonding wires between these two components. The position of the wires or the connection soldering may introduce a DC offset in the output of the sensor output. Thus, node 16 is the output signal of the sensor 14 into which a DC offset signal may be introduced by the interface after the sensor output. For example, an inertial sensor generates a capacitance output signal and the offset signal is a capacitance offset. The offset signal may be measured and an offset compensation signal equal in magnitude, but having an opposite sign, may be injected into the output of the sensor 14 at the interface or by the conditioning electronics 18 to compensate for the offset signal. While the offset compensation signal may initially remove the DC offset signal from the sensor output, it may later not be capable of compensating for the DC offset because the sensor changes during its operational life from environmental stresses and the like. These changes may cause the DC offset to change and the compensation signal may no longer effectively remove the DC offset from the output of the sensor. In the operational environment, the physical signal cannot be de-coupled or held to a zero value. Thus, the DC offset changes cannot be measured and the compensation signal cannot be adjusted accordingly during the operational life of the sensor circuit.

In FIG. 1, the DC offset is introduced into the sensor output signal after the sensor. In circuits in which an input signal is accessible, chopper stabilization may be used to separate and remove an offset signal from the output signal of a circuit. Specifically, the input signal can be modulated before the signal is provided to a signal processing circuit. The amplification of the signal by the processing circuit transfer function operates on the modulated input signal and the DC offset and the amplified signal is then demodulated. The demodulation separates the modulated input signal from the DC offset in the frequency domain. Using a low pass filter on the demodulated output signal significantly attenuates the demodulated offset signal without filtering out the demodulated measurement signal. This technique, however, is not available in a sensor application where the input signal cannot be directly modulated. Physical parameters measured by some sensors, such as acceleration sensors, cannot be directly modulated. Therefore, the technique described above cannot be used to measure the offset signal.

Although input signals cannot be modulated in sensor applications, the physical parameters of the sensor may be modulated. Modulation of a physical parameter of a sensor can modulate the output signal of the sensor without modulating the offset. Thus, some sensors may have a physical parameter that can be modulated to generate an output signal that is at a frequency that is substantially different than the DC offset. Consequently, demodulation of the output with a signal corresponding to the modulation signal and filtering of the result can be used to remove the DC offset from the measurement signal.

Modulation of a sensor physical parameter to identify and remove a DC offset from the measurement signal of a sensor is effective for sensors having a transfer function that produces a measurement signal that is directly proportional to the modulated parameter. Using this technique with a sensor having a transfer function that produces a measurement signal that is inversely proportional to the modulated parameter, however, is not effective. For example, if the sensor 14 of FIG. 1 is an accelerometer, the transfer function $H_{SensorElement}$ includes a $1/k$ factor where k is the spring constant. Thus, the output of the circuit in FIG. 1 is Input·$H_{SensorElement}$·Electronics+Offset·Electronics. That is, the first term of the output is the input signal multiplied by the transfer function of the sensor and the electronics and the second term is the offset multiplied by the transfer function of the electronics. Thus, the first term is divided by k, the spring constant. If the spring constant is the physical parameter that is modulated, the first term now varies non-linearly. Non-linear modulation of the input signal in this manner complicates identification of the input signal in the sensor measurement signal having a DC offset because the signal energy is spread over the frequency spectrum. Spreading the signal energy over the frequency spectrum produces a low signal-to-noise ratio in single harmonics of the signal. Trying to recover the entire input signal is computationally complex and, hence, expensive.

To avoid the issues arising from the non-linear modulation of input signals in sensors in which DC offset occurs, negative feedback may be used. As shown in FIG. 3, a circuit 300 has a forward path circuit 304 having a forward gain a and a negative feedback circuit 308 having a feedback gain f. The output of the feedback circuit 308 is subtracted from the input signal at the summing node. The ratio of the output to the input may be described as:

$$\frac{a}{1+af}.$$

In circuits where a is significantly larger than 1, this ratio is approximately $1/f$. Consequently, the signal transfer function of the circuit 300 with feedback does not depend upon the gain a in the forward path. Feedback, therefore, enables the physical parameter of the sensor to be modulated without modulating a portion of the sensor output signal attributable to the physical signal being converted to an electrical signal by the sensor.

Using feedback, as shown in the circuit 100 of FIG. 2, the output for a large loop-gain system is of the form:

$$\text{Output} = \text{Input} \cdot \frac{1}{FB} + \text{Offset} \cdot \frac{1}{FB \cdot H_{SensorElement}}.$$

Thus, the input signal is not affected by the modulation of the sensor physical parameter while the offset of the sensor is affected by that modulation. Consequently, the DC offset may be separated from the sensor signal in the output of the overall circuit as long as the modulated parameter varies in a frequency range where the circuit 100 has large loop gain.

The circuit of FIG. 2 is now described in more detail. The circuit 100 includes a sensor 14 having a transfer function H, a control signal input 104, an offset node 16, conditioning electronics 18, a feedback circuit 108, and a feedback node 110. The feedback circuit 108 provides a feedback signal as is well known. The control signal input 104 is coupled to a controller that provides a control signal to the sensor 14. The control signal modulates a physical parameter of the sensor 14. For example, an inertial sensor includes a spring-mass-damper system. Adjusting the spring constant or the mass coupled to the spring is an input signal-independent modulation of the sensor because the input signal cannot alter these physical parameters of the sensor. Modulating a physical parameter of a sensor, rather than the input signal to the sensor, to detect and measure DC offset is previously unknown.

Substituting $1/k$ for the sensor transfer function in the equation for the circuit of FIG. 2 presented above, the equation becomes:

$$\text{Output} = \text{Input}\frac{1}{FB} + \text{Offset} \cdot \frac{k}{FB}.$$

This equation indicates that the sensor signal is not affected by the modulation of the spring constant while the DC offset is affected by the spring constant modulation. Thus, the modulation may be performed in a manner that separates the DC offset from the sensor signal in the output of the circuit of FIG. 2. The spring constant k cannot be modulated with a zero mean because the spring constant always has some positive value. Consequently, some of the DC offset remains at low frequencies. That is, the spring constant $k = k_{constant} + k_{modulated}$. Thus, the output of the circuit shown in FIG. 2 may be represented by the graph shown in FIG. 4. The portion 200 of the output signal at or near the DC position represents the sensor output signal plus the portion of the DC offset associated with non-variable portion of the spring constant. The portion 204 is the DC offset affected by the modulated spring constant. This portion of the output signal is monitored by an offset cancellation circuit 500 that is coupled to the circuit of FIG. 2 to provide a circuit 500 as shown in FIG. 5. The magnitude of the signal portion 204 is compared by the offset cancellation circuit 504 to a threshold and, once the threshold is exceeded, a negative signal of a corresponding magnitude may then be added to the output signal at summing node 508 to remove the DC offset. By monitoring the measurement signal in the frequency range of the inversely proportional parameter modulation, the DC offset may be determined. The DC offset may then be used by the offset cancellation circuit 504 to generate a compensation value to remove the DC offset from the measurement signal.

Because the inversely proportional parameter of the sensor cannot be modulated about zero to yield a zero mean for the modulated parameter, the components of the parameter are measured during the calibration of the circuit. For example, the ratio of $k_{constant}$ and $k_{modulated}$ is measured during the calibration of the circuit that identifies the DC offset that is used to generate a DC compensation value as explained above. This measurement is performed by modulating the inversely proportional parameter while holding the input signal to zero. The ratio of the two parameter components may then be stored in the electronics. In response to the offset cancellation circuit 504 detecting a DC offset that exceeds the threshold, a new compensation value is generated for input at the summing node 508. By monitoring the modulation of the DC offset portion and generating a compensation value with the ratio factor, the offset cancellation circuit 504 remains capable of compensating for a fluctuating DC offset in the output of the sensor.

The feedback circuit 108 may be implemented with discrete analog or digital components. For example, the feedback circuit 108 may be configured to generate a continuous-time analog feedback signal to the input of the sensor 14. In another embodiment, the feedback circuit 104 may be configured to generate a continuous-time analog feedback signal with discrete output values, such as a pulse width modulation signal. This type of feedback signal makes the design of the feedback circuit simpler. In yet another embodiment, a discrete time implementation of the feedback circuit 108 may be used. A discrete time feedback circuit may be, for example, a sigma-delta modulator that receives the measurement signal and generates discrete output values. Use of a sigma-delta modulator enables time multiplexing to be used to provide multiple feedbacks. One of the generated feedback signals may be applied to the input signal as explained above to enable the input signal to be unaffected by the inversely proportional parameter and another generated feedback signal may be used to modulate the physical parameter of the sensor.

Selection of a modulation frequency for the physical parameter depends on a variety of factors. For example, a particular frequency band may produce outputs with signal-to-noise ratios (SNR) that are larger than another frequency band. For example, using a sigma-delta modulator for the feedback circuit 108 provides noise shaping with a large amount of noise in higher frequencies. Consequently, mid-range frequencies are more suitable for the modulating frequency. Within this mid-range, however, some input signal values, such as those caused by parasitic accelerations, may interfere with the sensor physical parameter modulation at the modulating frequency. To avoid this issue, different modulating frequencies in the mid-range are used and the measurements of the modulated portion of the output signal at the different frequencies are averaged. To further ensure that values caused by interfering input values do not adversely impact operation of the circuit, those measurements that significantly deviate from the mean of the measured signals are excluded from the averaging calculation.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

We claim:

1. A sensor circuit that enables detection of DC offset in a sensor output signal comprising:
   a sensor that generates a sensor output signal corresponding to a physical signal coupled to an input of the sensor, the sensor output signal having an input signal dependent component and a DC offset component; and
   a controller that generates a modulation signal, the modulation signal being operatively coupled to the sensor to modulate a physical parameter of the sensor and to separate a DC offset component of the sensor output signal affected by the modulation of the physical parameter of the sensor from the input signal dependent component of the sensor output signal.

2. The sensor circuit of claim 1 further comprising:
   a feedback circuit configured to generate a feedback signal, the feedback signal being coupled to the input of the sensor to enable the physical parameter of the sensor to be modulated without modulating the input signal dependent component of the sensor output signal.

3. The circuit of claim 2, the feedback circuit generating a feedback signal that is a continuous time analog feedback signal.

4. The circuit of claim 2, the feedback circuit generating a feedback signal that is a continuous time feedback signal having discrete values.

5. The circuit of claim 4, the feedback circuit generating a pulse width modulated feedback signal.

6. The circuit of claim 4 wherein the feedback circuit is a sigma-delta modulating circuit.

7. The circuit of claim 1 further comprising:
   an offset cancellation circuit configured to measure the DC offset component of the sensor output signal affected by the modulation of the physical parameter of the sensor and to generate an offset cancellation signal to compensate for the DC offset component of the sensor output signal affected by the modulation of the physical parameter of the sensor.

8. The circuit of claim 7, the controller generating the modulating signal at a plurality of different frequencies.

9. The circuit of claim 7 wherein the offset cancellation circuit mean averages a plurality of measurements of the DC offset components of the sensor output signal affected by the modulation of the physical parameter of the sensor to generate the offset cancellation signal with a magnitude corresponding to the mean average of the DC offset component measurements.

10. The circuit of claim 1 wherein the sensor is an inertial sensor.

11. The circuit of claim 10, the controller being coupled to the inertial sensor to modulate a spring constant.

12. A sensor circuit that enables detection of DC offset in a sensor output signal comprising:
a sensor that generates a sensor output signal corresponding to a physical signal coupled to an input of the sensor, the sensor output signal having an input signal dependent component and a DC offset component;
a controller that generates a modulation signal, the modulation signal being operatively coupled to the sensor to modulate a physical parameter of the sensor and to separate a DC offset component of the sensor output signal affected by the modulation of the physical parameter of the sensor from the input signal dependent component of the sensor output signal; and
a feedback circuit configured to generate a feedback signal, the feedback signal being coupled to the input of the sensor to enable the physical parameter of the sensor to be modulated without modulating the input signal dependent component of of the sensor output signal.

13. The circuit of claim 12 wherein the sensor generates a capacitance signal corresponding to the physical signal.

14. The circuit of claim 13 wherein the physical parameter of the sensor is a spring constant.

15. The circuit of claim 14 wherein the capacitance signal is inversely proportional to the spring constant of the sensor.

16. The circuit of claim 12, the feedback circuit generating a feedback signal that is a continuous time analog feedback signal.

17. The circuit of claim 12, the feedback circuit generating a feedback signal that is a continuous time feedback signal having discrete values.

18. The circuit of claim 17, the feedback circuit generating a pulse width modulated feedback signal.

19. The circuit of claim 17 wherein the feedback circuit is a sigma-delta modulating circuit.

20. The circuit of claim 12 further comprising:
an offset cancellation circuit that measures the DC offset component in the sensor output signal affected by the modulation of the physical parameter of the sensor at a modulation frequency; and
generates an offset cancellation signal corresponding to the measured DC offset components.

* * * * *